(12) United States Patent
Wallace et al.

(10) Patent No.: US 11,740,719 B1
(45) Date of Patent: Aug. 29, 2023

(54) MANAGING TOUCH CAPABILITIES OF AN EXPANDABLE DISPLAY DEVICE

(71) Applicant: Lenovo (United States) Inc., Morrisville, NC (US)

(72) Inventors: Brian William Wallace, Wake Forest, NC (US); Samuel Patterson, Raleigh, NC (US); Kathryn Cubrilovic, Raleigh, NC (US); John Travis Wettroth, Chapel Hil, NC (US)

(73) Assignee: Lenovo (United States) Inc., Morrisville, NC (US)

(*) Notice: Subject to any disclaimer, the term of this patent is extended or adjusted under 35 U.S.C. 154(b) by 0 days.

(21) Appl. No.: 17/884,379

(22) Filed: Aug. 9, 2022

(51) Int. Cl.
*G06F 3/041* (2006.01)
*G02F 1/1333* (2006.01)

(52) U.S. Cl.
CPC ........ *G06F 3/0412* (2013.01); *G02F 1/13338* (2013.01)

(58) Field of Classification Search
CPC .......................... G06F 3/0412; G02F 1/13338
See application file for complete search history.

(56) References Cited

U.S. PATENT DOCUMENTS

| 2014/0015743 | A1* | 1/2014 | Seo ....................... | G06F 1/3262 345/156 |
| 2014/0310643 | A1* | 10/2014 | Karmanenko ........ | G06F 1/1626 455/566 |
| 2019/0138179 | A1* | 5/2019 | Xia ....................... | G06F 1/1643 |

* cited by examiner

*Primary Examiner* — Peter D McLoone
(74) *Attorney, Agent, or Firm* — Kunzler Bean & Adamson

(57) ABSTRACT

Apparatus, methods, and computer program products that can are disclosed. One apparatus includes a display device including a display panel including a first panel portion including touch capabilities and at least one second panel portion excluding touch capabilities in which the second panel portion is configured to expand in relation to the first panel portion to create an expanded configuration for the display panel. The apparatus further includes a processor and a memory that stores code executable by the processor to manage the touch capabilities of the first panel portion. Managing the touch capabilities of the first panel portion may include turning ON/OFF the touch capabilities of the first panel portion. Methods and computer program products that include and/or perform the operations and/or functions of the apparatus are also disclosed.

20 Claims, 17 Drawing Sheets

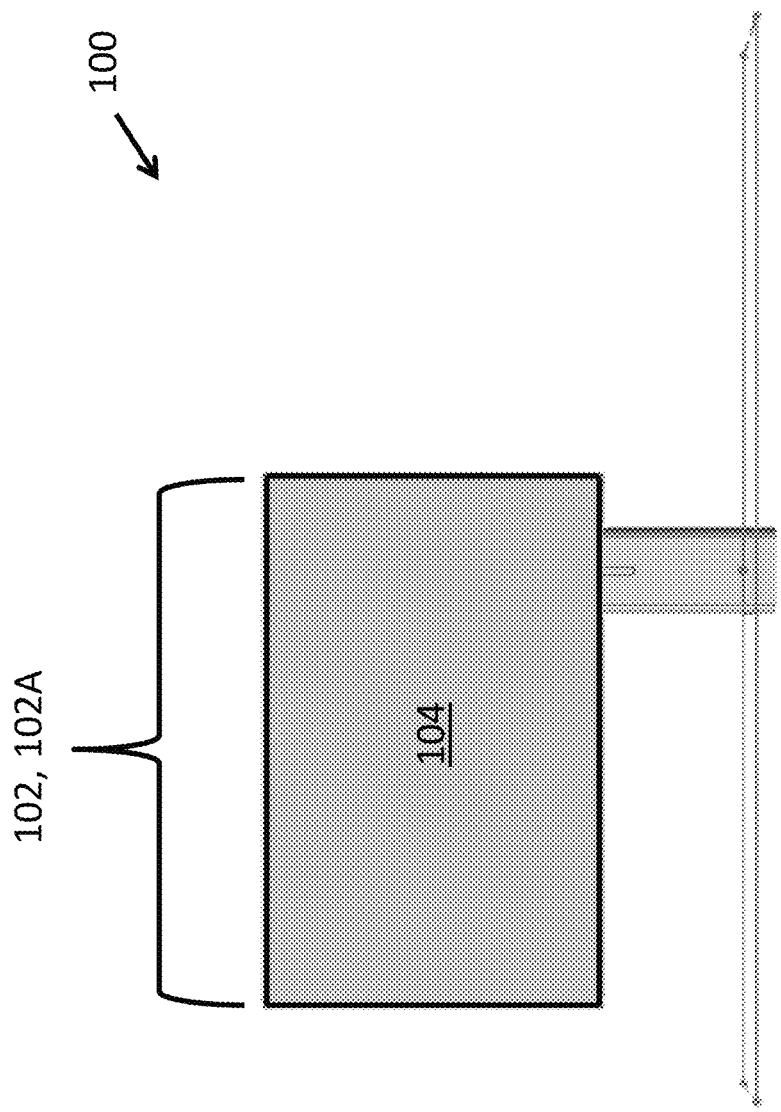

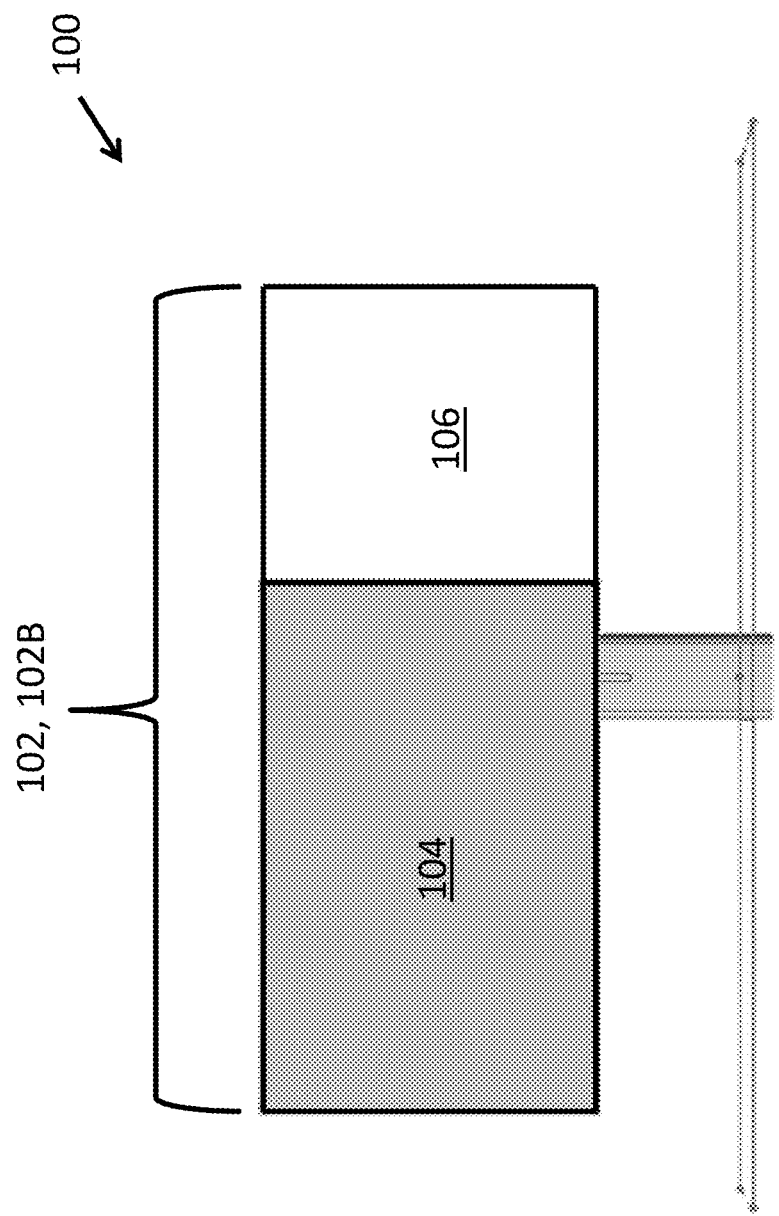

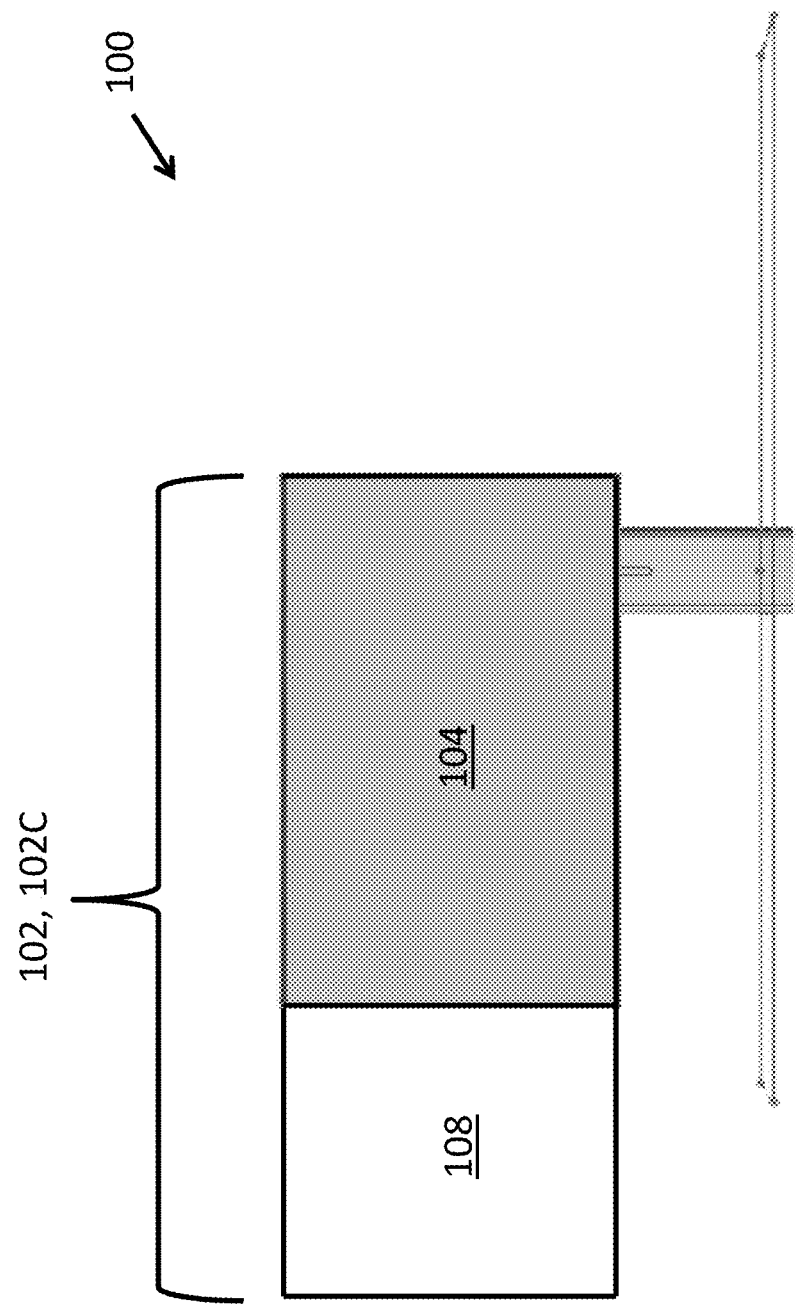

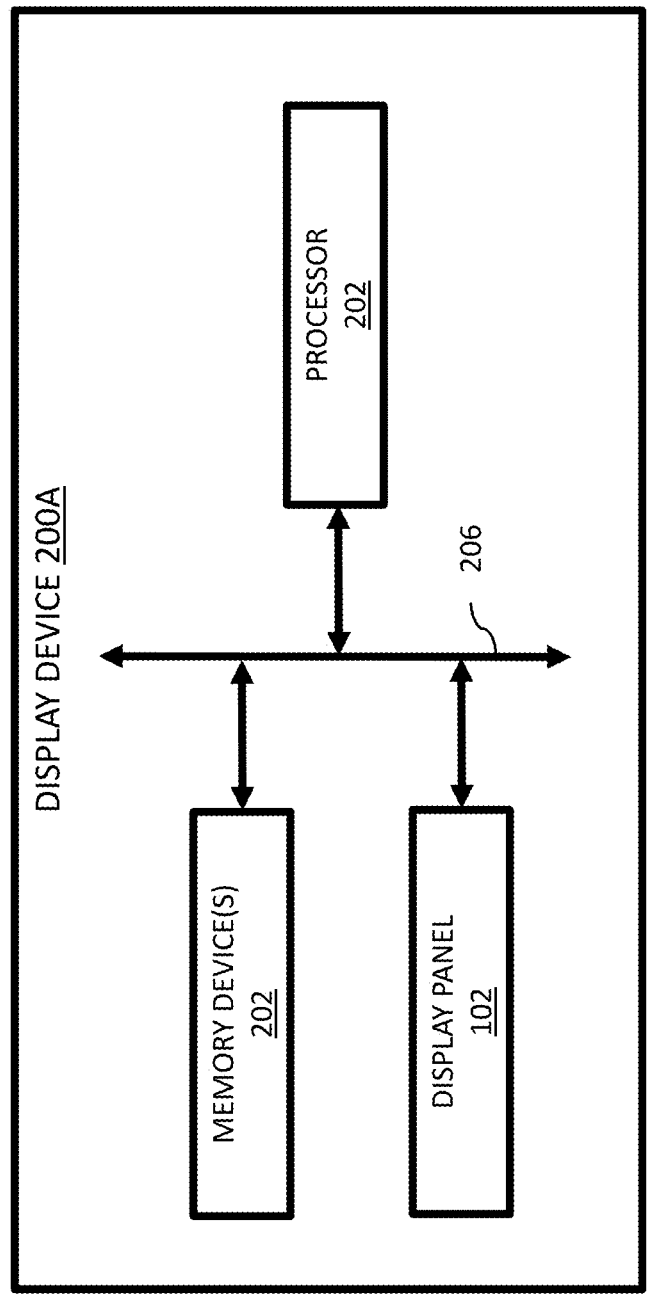

```
┌─────────────────────────────────────┐
│      MEMORY DEVICE 202A             │
│   ┌─────────────────────────────┐   │
│   │    TOUCH CAPABILITIES       │   │
│   │    MANAGEMENT MODULE        │   │
│   │            302              │   │
│   └─────────────────────────────┘   │
└─────────────────────────────────────┘
```

FIG. 3A

```
┌─────────────────────────────────────┐
│      MEMORY DEVICE 202B             │
│   ┌─────────────────────────────┐   │
│   │    TOUCH CAPABILITIES       │   │
│   │    MANAGEMENT MODULE        │   │
│   │            302              │   │
│   └─────────────────────────────┘   │
│   ┌─────────────────────────────┐   │
│   │       QUERY MODULE          │   │
│   │            304              │   │
│   └─────────────────────────────┘   │
│   ┌─────────────────────────────┐   │
│   │       INPUT MODULE          │   │
│   │            306              │   │
│   └─────────────────────────────┘   │
└─────────────────────────────────────┘
```

MANAGING TOUCH CAPABILITIES OF AN EXPANDABLE DISPLAY DEVICE

FIELD

The subject matter disclosed herein relates to display devices and more particularly relates to apparatus, methods, and program products for managing touch capabilities of an expandable display device.

DESCRIPTION OF THE RELATED ART

Conventional rollable organic light-emitting diode (OLED) display devices include a flexible display panel. The flexible display panel is capable is being rolled up to reduce the space needed to store the flexible display panel. By their nature, conventional designs for rollable OLED devices can be relatively fragile in structure. As such, conventional designs for rollable OLED devices do not include the durability needed to withstand the repeated touches by a user required by a touch panel.

BRIEF SUMMARY

Apparatus that can manage touch capabilities of an expandable display device are disclosed. One apparatus includes a display device comprising a display panel including a first panel portion including touch capabilities and at least one second panel portion excluding touch capabilities in which the second panel portion is configured to expand in relation to the first panel portion to create an expanded configuration for the display panel. The apparatus further includes a processor and a memory configured to store code executable by the processor to manage the touch capabilities of the first panel portion.

Also disclosed are methods for managing touch capabilities of an expandable display device. One method includes providing a display device comprising a display panel including a first panel portion including touch capabilities and at least one second panel portion excluding touch capabilities in which the second panel portion is configured to expand in relation to the first panel portion to create an expanded configuration for the display panel. The method further includes turning ON/OFF, by a processor, the touch capabilities of the first panel portion.

Computer program products including a computer-readable storage device including code embodied therewith are further disclosed herein. The code is executable by a processor and causes the processor to manage touch capabilities of an expandable display device. The executable code further causes the processor to identify a display device comprising a display panel including a first panel portion including touch capabilities and at least one second panel portion excluding touch capabilities in which the second panel portion is configured to expand in relation to the first panel portion to create an expanded configuration for the display panel. The code further causes the processor to turn ON/OFF the touch capabilities of the first panel portion.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIGS. 1A through 1D are schematic structural diagrams of an expandable display device including touch capabilities in accordance with various embodiments;

FIGS. 2A and 2B are schematic block diagrams of various embodiments of a display device including the structure of the display device of FIGS. 1A through 1D;

FIGS. 3A and 3B are schematic block diagrams of various embodiments of a memory device included in the display devices of FIGS. 2A and 2B;

DETAILED DESCRIPTION

Figure 1D:
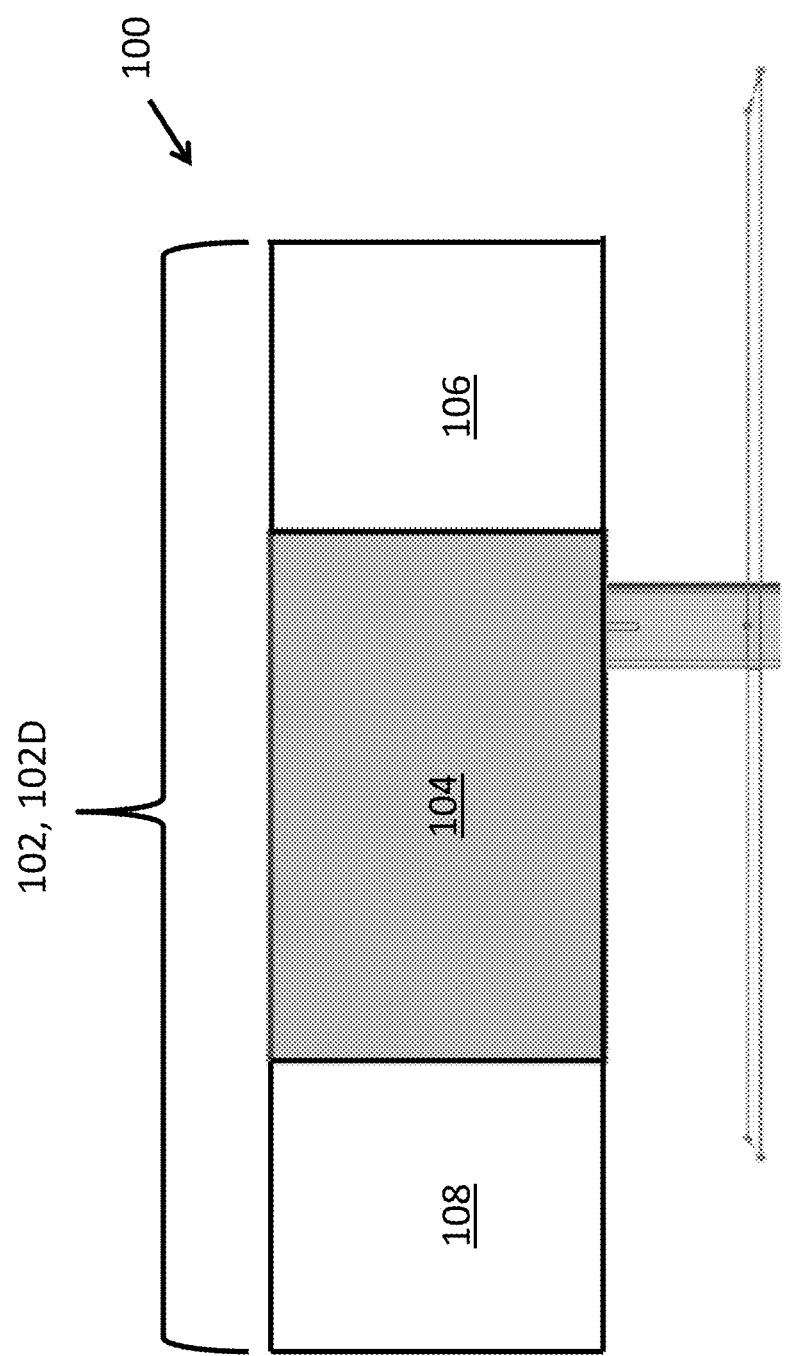

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions that implement the function/act specified in the schematic flowchart diagrams and/or schematic block diagrams block or blocks. In addition, the code may be loaded onto a computer, other programmable data processing apparatus, or other devices to cause a series of operational steps to be performed on the computer, other programmable apparatus or other devices to produce a computer-implemented process such that the code that executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With reference to the drawings, FIGS. 1A through 1D are schematic structural diagrams of an expandable display device 100 including touch capabilities in accordance with various embodiments. In some embodiments, the expandable display device 100 includes an internal display device. In other embodiments, the expandable display device 100 includes an external display device.

The expandable display device 100 may include any suitable type of display device that is known or developed in the future capable of displaying images/data, video/data feeds, and/or video/data streams, etc. In various embodiments, the expandable display device 100 includes and/or defines an organic light-emitting diode (OLED) display device. In additional or alternative embodiments, the expandable display device 100 includes and/or defines a rollable OLED display device.

As disclosed herein, the expandable display device 100 is expandable and contractable. The expandable display device 100 may be expanded and contracted in any suitable manner that is known or developed in the future. That is, while the various embodiments disclosed herein include horizontal expansion/contraction, various other embodiments may include one or more alternative or additional expansion/contraction directions (e.g., vertical expansion/contraction, diagonal expansion/contraction, and/or rotational expansion/contraction, rollable expansion/contraction, foldable expansion/contraction, etc.). As such, an expandable display device 100 may be expanded and/or contracted in any manner that allows and/or enables the expandable display device 100 to include multiple expanded configurations, multiple contracted configurations, and multiple expanded/contracted configurations.

The expandable display device 100 illustrated in FIGS. 1A through 1D includes an expandable/contractable display panel 102. The display panel 102 is shown in FIGS. 1A, 1B, 1C, and 1D as including a display panel configuration 102A, 102B, 102C, and 102D, respectively.

As discussed with reference to FIGS. 1A through 1D, the display panel 102 includes a display panel portion 104. In certain embodiments, the display panel 102 further includes a display panel portion 106 (see, e.g., FIGS. 1B and 1D) and/or a display panel portion 108 (see, e.g., FIGS. 1C and 1D).

At least in the illustrated embodiments, the display panel 102 includes, among other components and/or features, a display panel portion 104. The display panel portion 104 can include and/or define a central or base panel portion.

The display panel portion 104, in various embodiments, includes and/or defines a touch screen and/or touch panel. The display panel portion 104 may include any suitable technology that is known or developed in the future that allows and/or enables the display panel portion 104 to operate and/or function as a touch screen and/or touch panel. That is, the display panel portion 104 may include any suitable technology that is known or developed in the future that allows and/or enables the display panel portion 104 to receive touch inputs from a user (e.g., a human) and/or includes one or more touch input capabilities or simply one or more touch input capabilities.

The touch input capabilities and/or touch capabilities of the display panel portion 104 may include any suitable touch input capabilities and/or touch capabilities that is/are known or developed in the future. That is, display panel portion 104 may receive any suitable touch input and/or type of touch input that is known or developed in the future.

In some embodiments, the display panel portion 104 includes and/or defines an OLED panel and/or OLED screen. In additional embodiments, the display panel portion 104 includes and/or defines an OLED touch panel and/or OLED touch screen.

In various embodiments, the display panel portion 104 includes a reinforced structure. The display panel portion 104 may be structurally reinforced using any suitable material(s) and/or technique(s) that are known or developed in the future capable of providing the display panel portion 104 with the durability to withstand the rigors, stress, and/or pressure of multiple user touches placed on a touch screen/panel over time.

The display panel configuration 102A illustrated in FIG. 1A can include and/or define a fully contracted configuration. The fully contracted configuration defined by display panel configuration 102A can apply to the embodiments of the display panel(s) 102 illustrated in FIGS. 1B, 1C, and/or 1D.

The embodiment illustrated in FIG. 1B includes, among other components and/or features, a display panel portion 104 and a display panel portion 106. The display panel portion 104 may include any of the embodiments of a display panel portion 104 discussed elsewhere herein.

The display panel portion 106 can include and/or define a right panel portion. The display panel portion 106 may include any display panel that is known or developed in the future. In some embodiments, the display panel portion 106 includes and/or defines an OLED panel and/or OLED screen. In additional embodiments, the display panel portion 106 includes and/or defines an OLED panel and/or OLED screen that is void of touch capabilities and/or is incapable of receiving touch inputs from a user.

The display panel configuration 102B illustrated in FIG. 1B, in some embodiments, includes and/or defines a fully expanded configuration for a display panel 102. In other embodiments (see, e.g., FIG. 1D), the display panel configuration 102B illustrated in FIG. 1B includes and/or defines a partially expanded configuration and/or partially contracted configuration for a display panel 102.

The embodiment illustrated in FIG. 1C includes, among other components and/or features, a display panel portion 104 and a display panel portion 108. The display panel portion 104 may include any of the embodiments of a display panel portion 104 discussed elsewhere herein.

The display panel portion 108 can include and/or define a left panel portion. The display panel portion 108 may include any display panel that is known or developed in the future. In some embodiments, the display panel portion 108 includes and/or defines an OLED panel and/or OLED screen. In additional embodiments, the display panel portion 108 includes and/or defines an OLED panel and/or OLED screen that is void of touch capabilities and/or is incapable of receiving touch inputs from a user.

The display panel configuration 102C illustrated in FIG. 1C, in some embodiments, includes and/or defines a fully expanded configuration for a display panel 102. In other embodiments (see, e.g., FIG. 1D), the display panel configuration 102C illustrated in FIG. 1C includes and/or defines a partially expanded configuration and/or partially contracted configuration for a display panel 102.

The embodiment illustrated in FIG. 1D includes, among other components and/or features, a display panel portion 104, a display panel portion 106, and a display panel portion 108. The display panel portion 104 may include any of the embodiments of a display panel portion 104 discussed elsewhere herein.

The display panel portion 106 can include and/or define a right panel portion. The display panel portion 106 may include any display panel that is known or developed in the future. In some embodiments, the display panel portion 106 includes and/or defines an OLED panel and/or OLED screen. In additional embodiments, the display panel portion 106 includes and/or defines an OLED panel and/or OLED screen that is void of touch capabilities and/or is incapable of receiving touch inputs from a user.

The display panel portion 108 can include and/or define a left panel portion. The display panel portion 108 may include any display panel that is known or developed in the future. In some embodiments, the display panel portion 108 includes and/or defines an OLED panel and/or OLED screen. In additional embodiments, the display panel portion 108 includes and/or defines an OLED panel and/or OLED screen that is void of touch capabilities and/or is incapable of receiving touch inputs from a user.

The display panel configuration 102D illustrated in FIG. 1D, in some embodiments, includes and/or defines a fully expanded configuration for a display panel 102. In certain embodiments, the display panel configuration 102A illustrated in FIG. 1A includes and/or defines a fully contracted configuration for a display panel 102. In additional or alternative embodiments, the display panel configurations 102B and 102C illustrated in FIGS. 1B and 1C, respectively, each include and/or define a partially expanded configuration and/or partially contracted configuration for a display panel 102.

In various embodiments, the touch input capabilities and/or touch capabilities of the display panel portion 104 is/are based on a display panel configuration 102A, 102B, 102C, and 102D. In some embodiments, the touch input capabilities and/or touch capabilities of the display panel portion 104 can be managed (e.g., turned ON and/or turned OFF) based on a display panel configuration 102A, 102B, 102C, and 102D. That is, the touch input capabilities and/or touch capabilities of the display panel portion 104 can be turned ON/OFF in response to receiving a corresponding ON/OFF command from a processor, as discussed elsewhere herein.

In additional or alternative embodiments, the touch input capabilities and/or touch capabilities of the display panel portion 104 are automatically turned ON and/or turned OFF based on a display panel configuration 102A, 102B, 102C, and 102D. In certain embodiments, the touch input capabilities and/or touch capabilities of the display panel portion 104 are automatically turned ON (or remain ON) in response to the display panel portion 104 including the display panel configuration 102A and are automatically turned OFF (or remain OFF) in response to the display panel portion 104 including the display panel configurations 102B, 102C, or 102D.

With reference to FIG. 2A, FIG. 2A is a schematic block diagram of one embodiment of a display device 200A. At least in the illustrated embodiment, the display device 200A includes a display panel 102 similar to any of the embodiments of a display panel 102 of a display 100 discussed with reference to FIGS. 1A through 1D, a set of memory devices 202, and a processor 204 coupled to and/or in communication with one another via a bus 206 (e.g., a wired and/or wireless bus).

A set of memory devices 202 may include any suitable quantity of memory devices 202. Further, a memory device 202 may include any suitable type of device and/or system that is known or developed in the future that can store computer-useable and/or computer-readable code. In various embodiments, a memory device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 204).

A memory device 202, in some embodiments, includes volatile computer storage media. For example, a memory device 202 may include random access memory (RAM), including dynamic RAM (DRAM), synchronous dynamic RAM (SDRAM), and/or static RAM (SRAM). In other embodiments, a memory device 202 includes non-volatile computer storage media. For example, a memory device 202 may include a hard disk drive, a flash memory, and/or any other suitable non-volatile computer storage device that is known or developed in the future. In various embodiments, a memory device 202 includes both volatile and non-volatile computer storage media.

With reference now to FIG. 3A, FIG. 3A is a schematic block diagram of one embodiment of a memory device 202A. At least in the illustrated embodiment, the memory device 202A includes, among other components, a touch capabilities management module 302, that is configured to operate/function when executed by the processor 204 to manage the touch capabilities of the display device 100, the display panel 102, and/or the display panel portion 104.

A touch capabilities management module 302 may include any suitable hardware and/or software that is capable of managing the touch operation(s) and/or touch function(s) of the display device 100, the display panel 102, and/or the display panel portion 104. In various embodiments, the touch capabilities management module 302 is configured to turn ON and turn OFF the touch capabilities (e.g., the touch operation(s) and/or touch function(s)) of the display panel portion 104.

In various embodiments, the touch capabilities management module 302 is configured to turn ON (or have remain ON) the touch capabilities of the display panel portion 104 in response to the display panel 102 being fully contracted. Further, the touch capabilities management module 302 is configured to turn OFF (or have remain OFF) the touch capabilities of the display panel portion 104 in response to the display panel 102 not being fully contracted (e.g., including the display panel configuration 102B, 102C, or 102D).

Referring to FIG. 3B, FIG. 3B is a schematic block diagram of another embodiment of a memory device 202B.

The memory device 202B includes a touch capabilities management module 302 similar to the touch capabilities management module 302 discussed with reference to the memory device 202A. At least in the illustrated embodiment, the memory device 202B further includes, among other components, a query module 304 and an input module 306 that are configured to operate/function with the touch capabilities management module 302 when executed by the processor 204 to manage the touch capabilities of the display device 100, the display panel 102, and/or the display panel portion 104.

A query module 304 may include any suitable hardware and/or software that can transmit one or more queries to a user. The query module 304 may further include any suitable hardware and/or software that can receive a response for each query from the user.

In certain embodiments, the display panel 102 is configured to startup and/or initialize the display panel portion 104 with touch capabilities. In some embodiments, the query module 304 is configured to monitor (e.g., continuously, substantially continuously, periodically, etc.) the display panel 102 to determine and/or detect whether the display panel 102 is fully contracted (e.g., includes display panel configuration 102A) and/or expanded (e.g., includes display panel configuration 102B, 102C, or 102D).

In various embodiments, the query module 304 is configured to transmit a query (which can include an alert) to the user in response to the query module 304 determining/detecting that the display panel 102 is expanded (e.g., includes the display panel configuration 102B, 102C, or 102D) and is further configured to receive an answer/response from the user. The query, in various embodiments, is configured to ask the user whether the user would like the touch capabilities of the display panel portion 104 to remain ON while the display panel 102 is expanded or whether the user would like the touch capabilities of the display panel portion 104 turned OFF while the display panel 102 is expanded.

The query module 304 is configured to command and/or instruct the touch capabilities management module 302 to maintain the touch capabilities of the display panel portion 104 (e.g., have the touch capabilities of the display panel portion 104 remain ON) in response to the user selecting and/or indicating that the user would like the touch capabilities of the display panel portion 104 to remain ON while the display panel 102 is expanded (which can also include the query module 304 doing nothing so that the default ON setting continues). Conversely, the query module 304 is configured to command and/or instruct the touch capabilities management module 302 to turn OFF the touch capabilities of the display panel portion 104 in response to the user selecting and/or indicating that the user would like the touch capabilities of the display panel portion 104 turned OFF while the display panel 102 is expanded.

In additional or alternative embodiments, the query module 304 is configured to transmit a query (which can include an alert) to the user in response to the query module 304 determining and/or detecting that the display panel 102 is fully contracted (e.g., includes the display panel configuration 102A) and is further configured to receive an answer/response from the user. This query, in various embodiments, is configured to ask the user whether the user would like the touch capabilities of the display panel portion 104 to remain OFF while the display panel 102 is fully contracted or whether the user would like the touch capabilities of the display panel portion 104 turned ON while the display panel 102 is fully contracted.

The query module 304 is configured to command and/or instruct the touch capabilities management module 302 to maintain OFF the touch capabilities of the display panel portion 104 (e.g., have the touch capabilities of the display panel portion 104 remain OFF) in response to the user selecting and/or indicating that the user would like the touch capabilities of the display panel portion 104 to remain OFF while the display panel 102 is fully contracted. Conversely, the query module 304 is configured to command and/or instruct the touch capabilities management module 302 to turn ON the touch capabilities of the display panel portion 104 in response to the user selecting and/or indicating that the user would like the touch capabilities of the display panel portion 104 turned ON while the display panel 102 is contracted.

In the various embodiments, the OFF process can be repeated each time that the display panel 102 is expanded. Similarly, the ON process can be repeated each time that the display panel 102 is fully contracted.

An input module 306 may include any suitable hardware and/or software that is capable of receiving a user input. In various embodiments, the user input includes a user selecting whether to turn ON or turn OFF (e.g., manually turn ON/OFF) the touch capabilities of the display panel portion 104.

In various embodiments, the user is capable of overriding a default/automatic setting and/or subsequently changing the touch capabilities of the display panel portion 104 after the user has made a selection. In some embodiments, the input module 306 is configured to receive an updated and/or new selection for the touch capabilities of the display panel portion 104 (e.g., have the touch capabilities of the display panel portion 104 remain ON), which can be implemented by the touch capabilities management module 302.

The input module 306 is configured to command and/or instruct the touch capabilities management module 302 to turn ON the touch capabilities of the display panel portion 106 in response to the user selecting and/or indicating that the user would like the touch capabilities of the display panel portion 104 to be turned ON while the display panel 102 is expanded or fully contracted and/or regardless of whether the display panel 102 is expanded or fully contracted. Similarly, input module 306 is configured to command and/or instruct the touch capabilities management module 302 to turn OFF the touch capabilities of the display panel portion 106 in response to the user selecting and/or indicating that the user would like the touch capabilities of the display panel portion 104 to be turned OFF while the display panel 102 is expanded or fully contracted and/or regardless of whether the display panel 102 is expanded or fully contracted.

Here, the user is able decide in real time and/or on-the-fly whether the user would like the touch capabilities of the display panel portion 104 to be turned ON/OFF. Further, the ON/OFF process can be repeated by the user as desired by the user.

Referring back to FIG. 2A, a processor 204 may include any suitable non-volatile/persistent hardware and/or software configured to perform and/or facilitate performing various processing functions and/or operations. In various embodiments, the processor 204 includes hardware and/or software for executing instructions in one or more modules. The one or more modules executed by the processor 204 can be stored on and executed from a memory device 202 and/or from the processor 204.

Figure 4A:
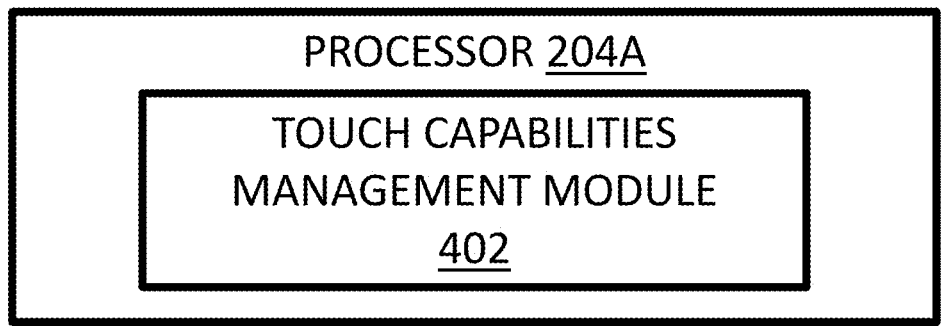
FIGS. 4A and 4B are schematic block diagrams of various embodiments of a processor included in the display devices of FIGS. 2A and 2B.

With reference to FIG. 4A, FIG. 4A is a schematic block diagram of one embodiment of a processor 204A. At least in the illustrated embodiment, the processor 204A includes, among other components, a touch capabilities management module 402 similar to the touch capabilities management module 302 in the memory device 202A discussed with reference to FIG. 3A.

Figure 4B:
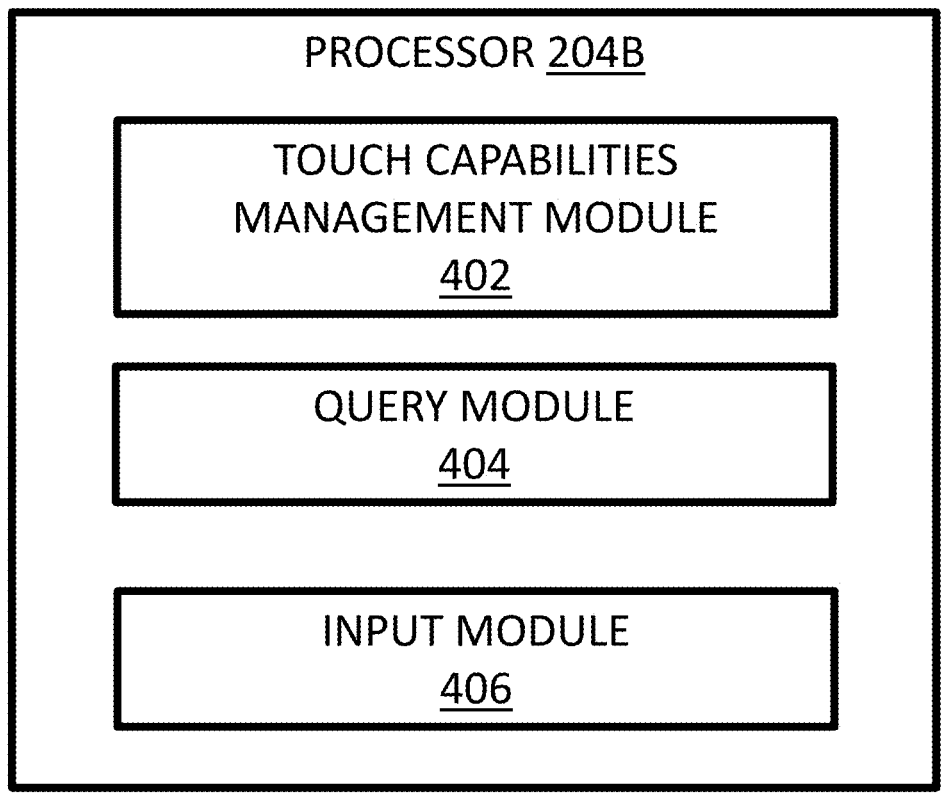

Referring to FIG. 4B, FIG. 4B is a block diagram of another embodiment of a processor 204B. The processor 204B includes, among other components, a touch capabilities management module 402, a query module 404, and an input module 406 similar to the touch capabilities management module 302, query module 304, and input module 306 discussed with reference to in the memory device 202B discussed with reference to FIG. 3B.

Figure 2B:
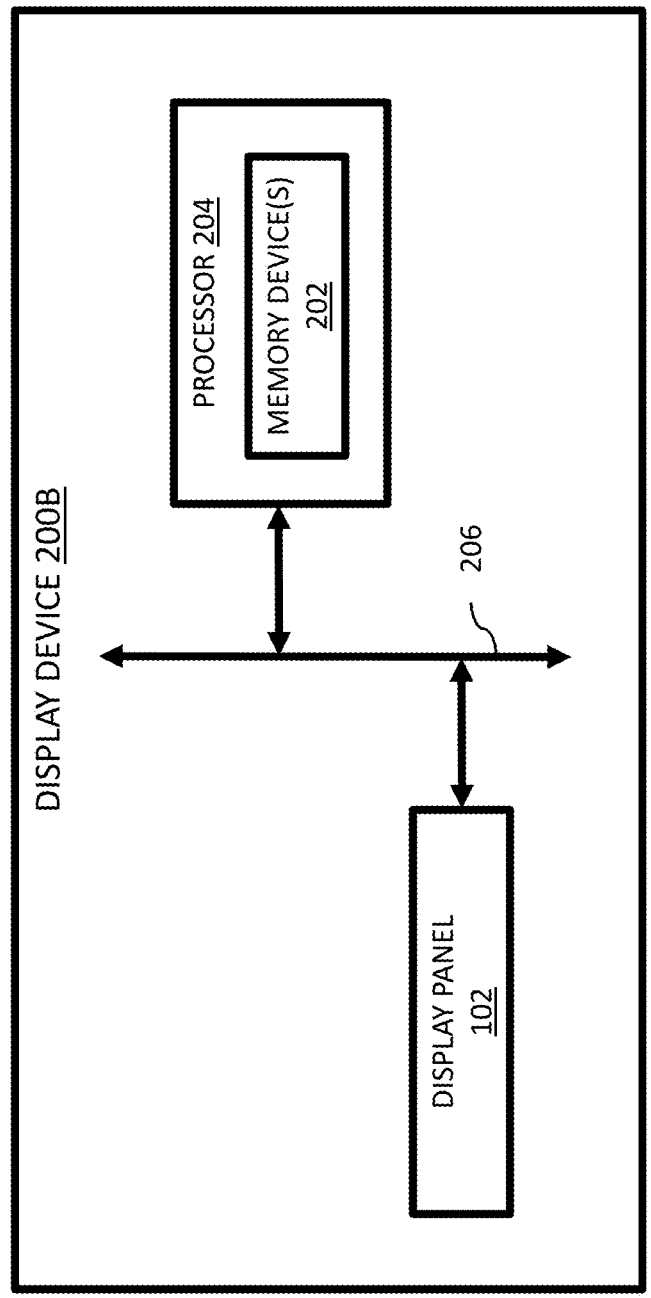

With reference to FIG. 2B, FIG. 2B is a block diagram of another embodiment of a schematic block diagram of another embodiment of a display device 200B. At least in the illustrated embodiment, the display device 200B includes a display panel 102, a set of memory devices 202, and a processor 204 coupled to and/or in communication with one another via a bus 206 (e.g., a wired and/or wireless bus). Alternative to the display device 200A, the processor 204 in the display device 200B includes the memory device(s) 202 as opposed to the memory device(s) 202 of the display device 200A being a different device than and/or independent of the processor 204.

Figure 5A:
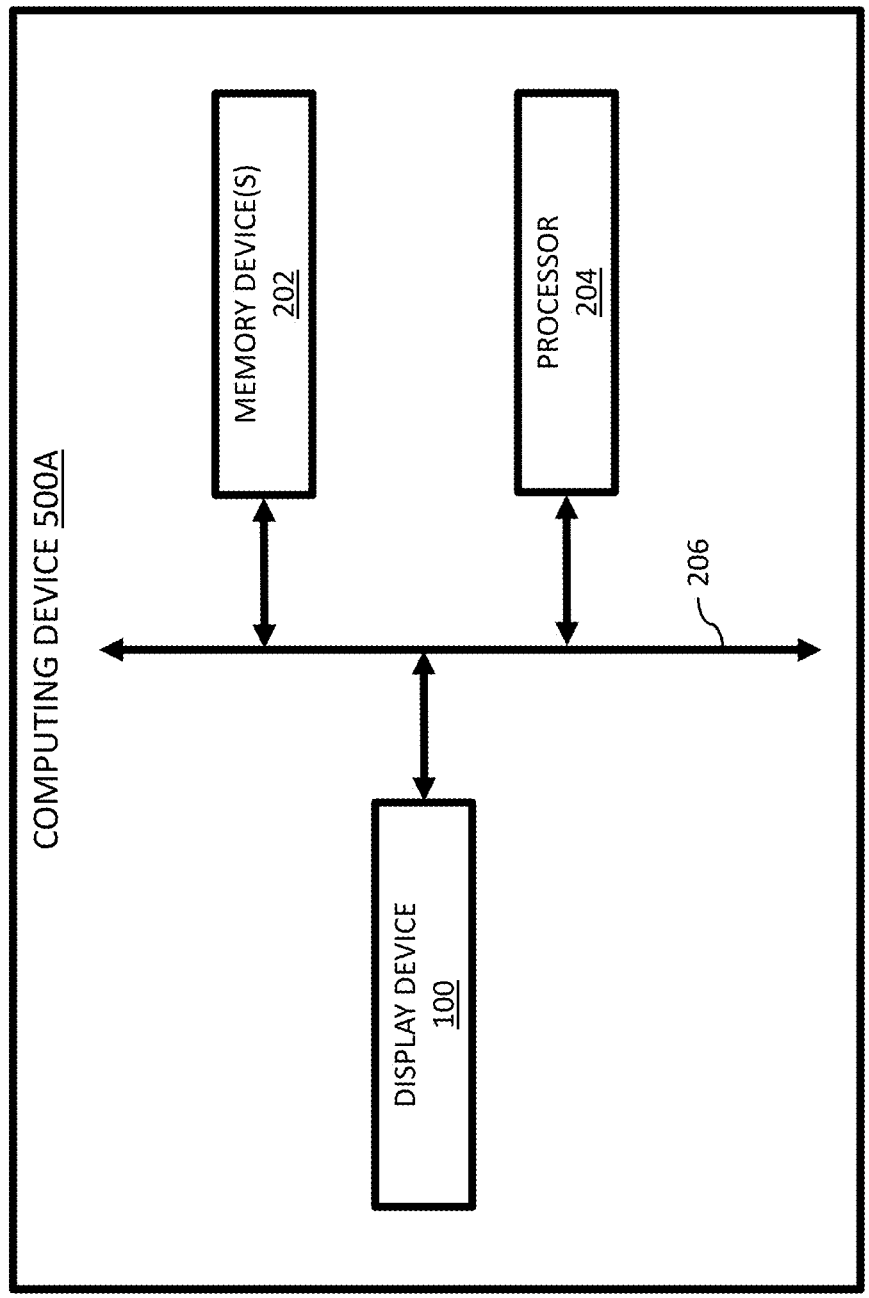
FIGS. 5A and 5B are schematic block diagrams of various embodiments of a computing device including a display device including the structure of the display device of FIGS. 1A through 1D.

Referring to FIG. 5A, FIG. 5A is a block diagram of one embodiment of a computing device 500A. The computing device 500A includes, among other components, a display device 100, one or more memory devices 202, and a processor 204 coupled to and in communication with one another via the bus 206 similar to the various embodiments of the display device 100, memory device(s) 202, processor 204 and bus 206 discussed above.

The display device 100 in the computing device 500A is an integrated display. As such, the computing device 500A may include any suitable computing device that is known or developed in the future that can include an integrated display device 100. Examples of a computing device 500A include, but are not limited to, a laptop computer, a personal digital assistant (PDA), a tablet computer, a smart phone, a cellular telephone, a wearable device, an Internet of Things (IoT) device, a gaming device, a vehicle on-board computer, a smart device, and a digital assistant, etc., among other computing devices that can include an integrated display that are possible and contemplated herein.

Figure 5B:
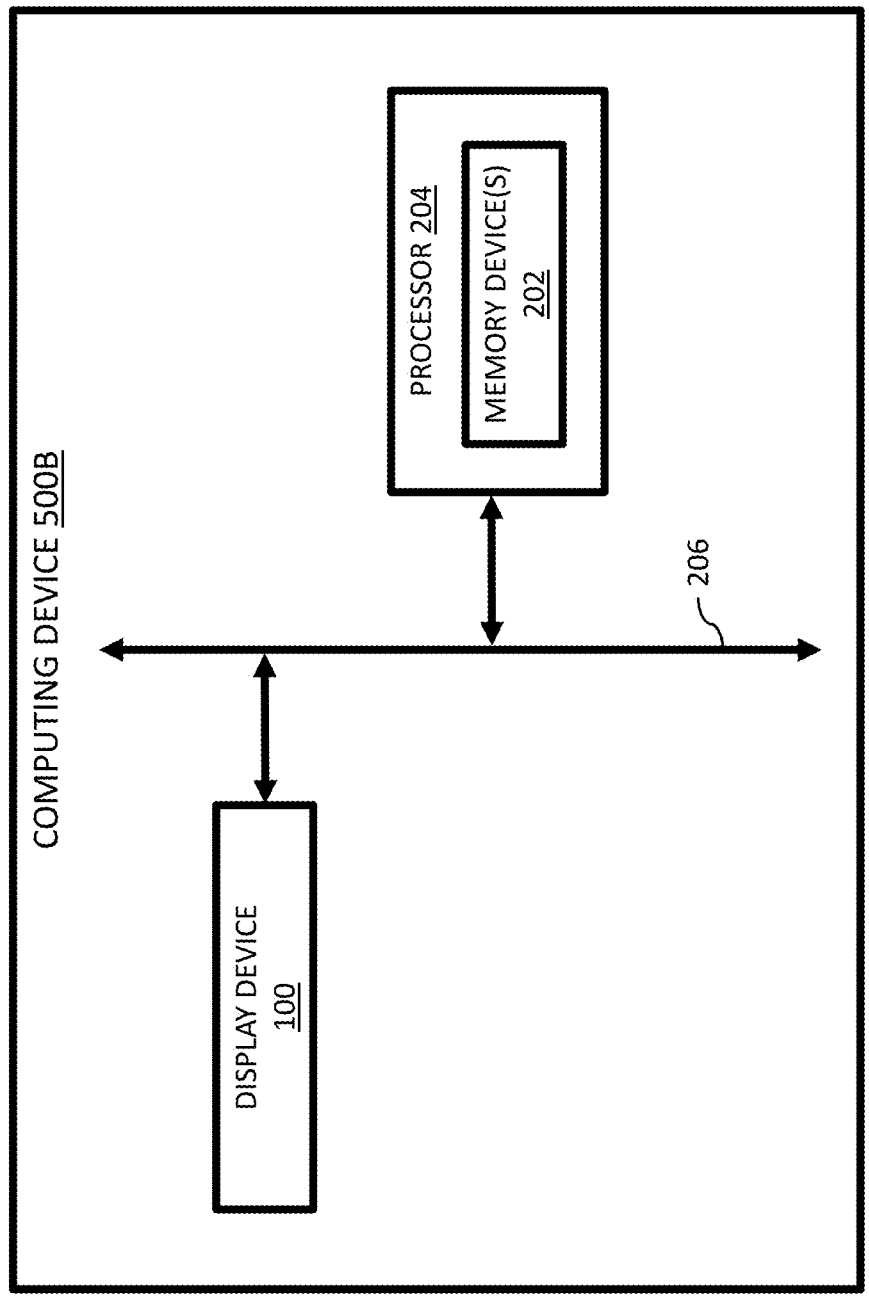

With reference to FIG. 5B, FIG. 5B is a block diagram of another embodiment of a computing device 500B. The computing device 500B includes, among other components, a display device 100, one or more memory devices 202, and a processor 204 coupled to and in communication with one another via the bus 206 similar to the various embodiments of the display device 100, memory device(s) 202, processor 204 and bus 206 in the computing device 500A discussed above with reference to FIG. 5A. Alternative to the computing device 500A, the processor 204 in the computing device 500B includes the memory device(s) 202 as opposed to the memory device(s) 202 of the computing device 500A being a different device than and/or independent of the processor 204.

Figure 6A:
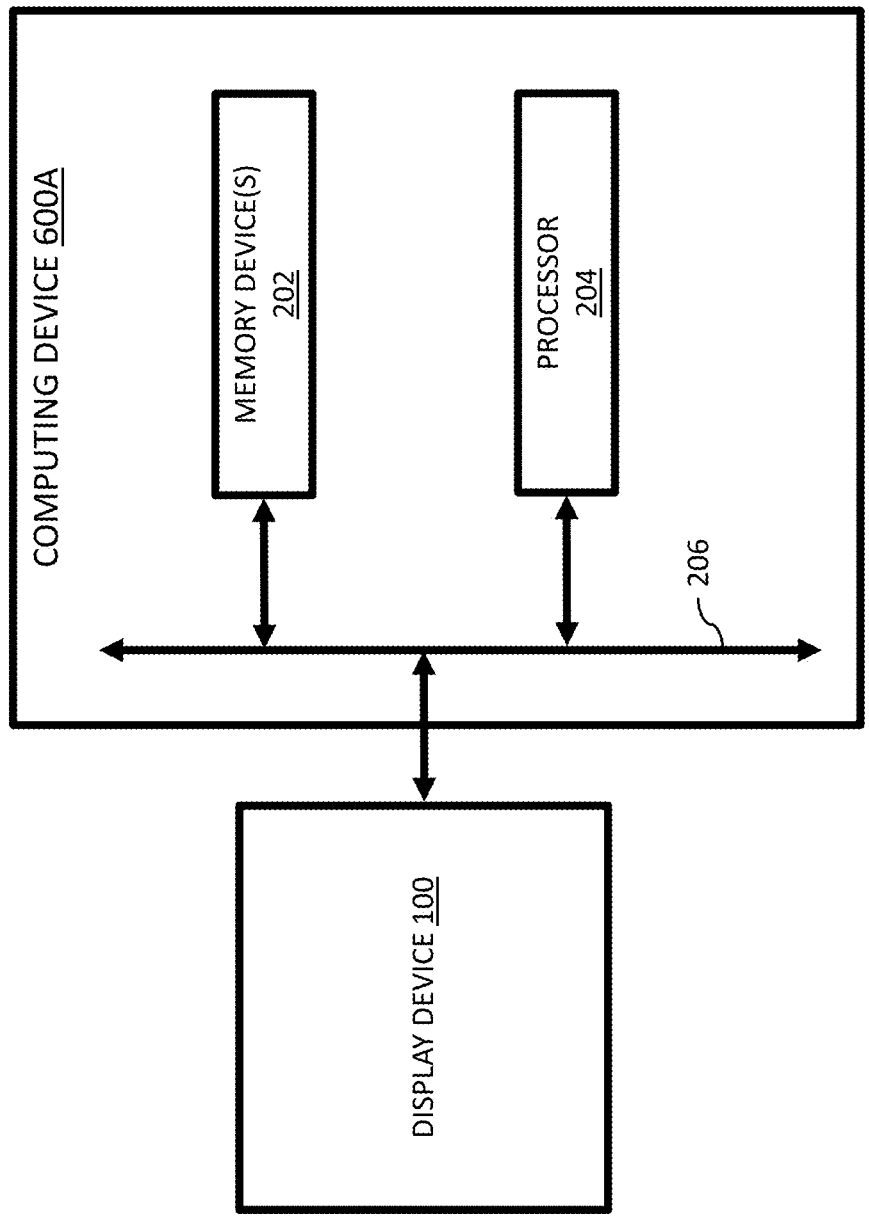
FIGS. 6A and 6B are schematic block diagrams of various other embodiments of a computing device including a display device including the structure of the display device of FIGS. 1A through 1D.

Referring to FIG. 6A, FIG. 6A is a block diagram of one embodiment of a computing device 600A. The computing device 600A includes, among other components, a display device 100, one or more memory devices 202, and a processor 204 coupled to and in communication with one another via the bus 206 similar to the various embodiments of the display device 100, memory device(s) 202, processor 204 and bus 206 discussed above.

The display device 100 associated with the computing device 600A is an external display. As such, the computing device 600A may include any suitable computing device that is known or developed in the future that can include an external display device 100. Examples of a computing device 600A include, but are not limited to, a desktop computer, a gaming device, and a vehicle on-board computer, etc., among other computing devices that can include an external display that are possible and contemplated herein.

Figure 6B:
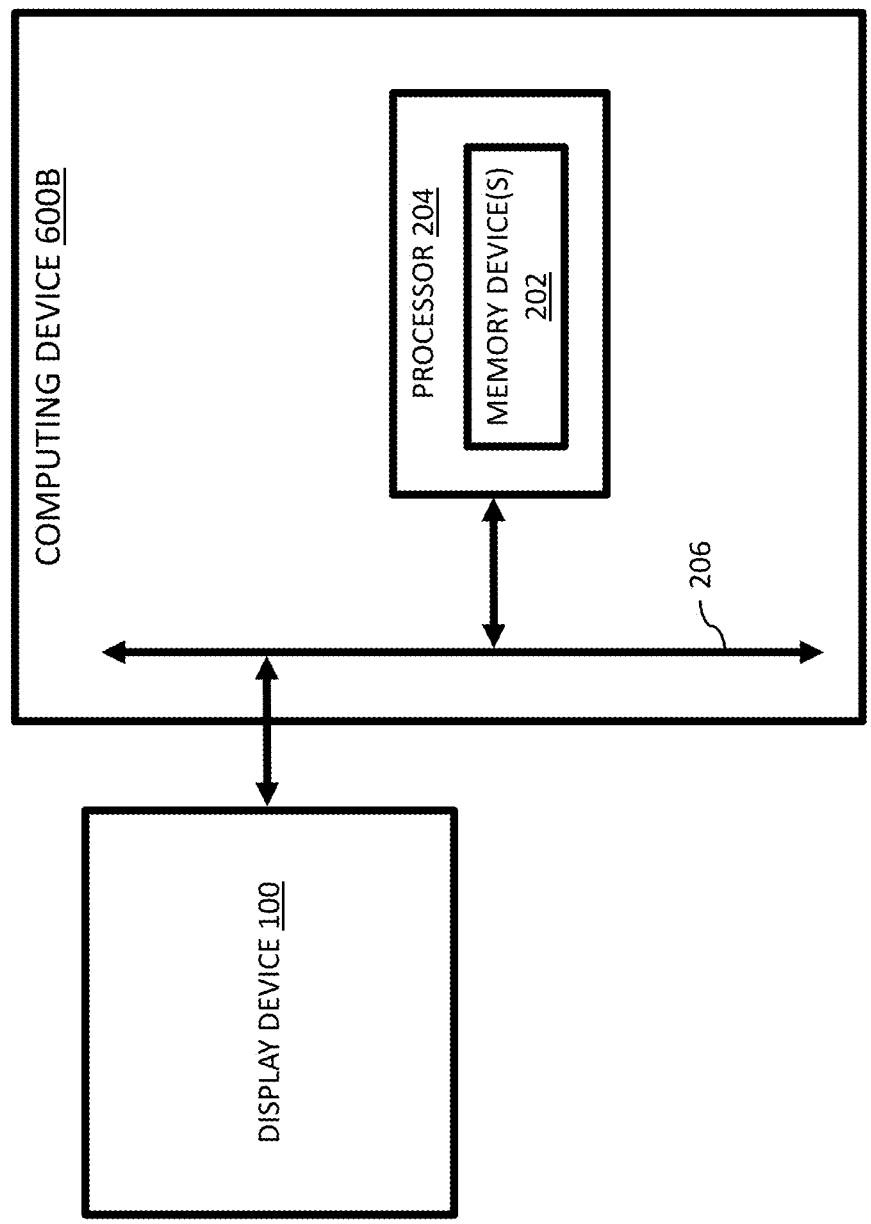

With reference to FIG. 6B, FIG. 6B is a block diagram of another embodiment of a computing device 600B. The computing device 600B includes, among other components, a display device 100, one or more memory devices 202, and a processor 204 coupled to and in communication with one another via the bus 206 similar to the various embodiments of the display device 100, memory device(s) 202, processor 204 and bus 206 in the computing device 600A discussed above with reference to FIG. 6A. Alternative to the computing device 600A, the processor 204 in the computing device 600B includes the memory device(s) 202 as opposed to the memory device(s) 202 of the computing device 600A being a different device than and/or independent of the processor 204.

Figure 7:
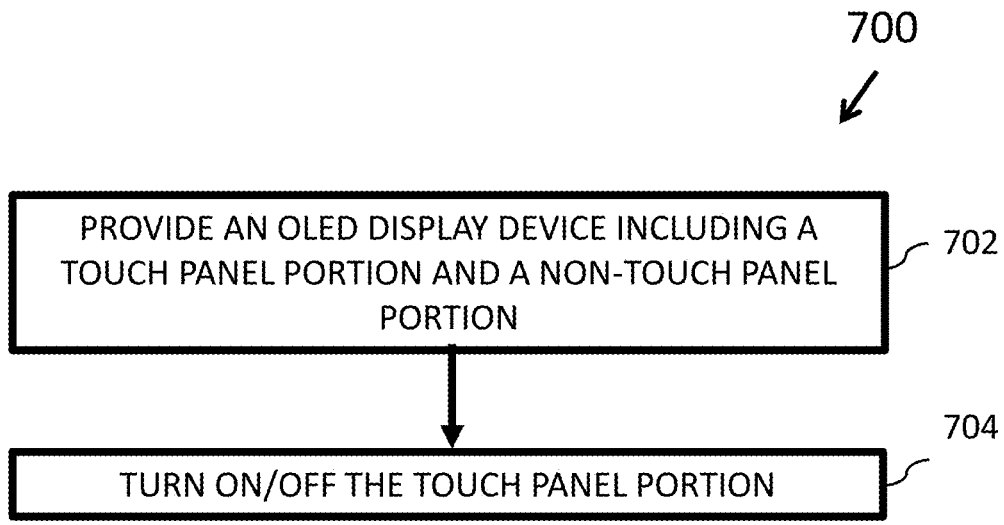
FIGS. 7 through 12 are flow diagrams of various embodiments of a method for managing touch capabilities of an expandable display device.

FIG. 7 is a schematic flow chart diagram illustrating one embodiment of a method 700 for managing touch capabilities of an expandable display device. At least in the illustrated embodiment, the method 700 begins by providing an OLED display device 100 including a touch panel portion (e.g., display panel portion 104) and at least one non-touch panel portion (e.g., display panel portion 106 and/or display panel portion 108) (block 702).

The method 700 further includes turning ON/OFF, by a processor (e.g., processor 204), the touch panel portion (block 704). In some embodiments, the touch panel portion is turned OFF in response to a display panel (e.g., display panel 102) being expanded and turned ON in response to the display panel 102 being contracted, as discussed elsewhere herein. In further embodiments, the touch panel portion is automatically turned OFF and ON in response to the display panel (e.g., display panel 102) being expanded and contracted, respectively.

In additional or alternative embodiments, the touch panel portion is turned ON/OFF in response to a user selection, as discussed elsewhere herein. The user selection can be in response to a query and/or receiving a user input, as further discussed elsewhere herein.

Figure 8:
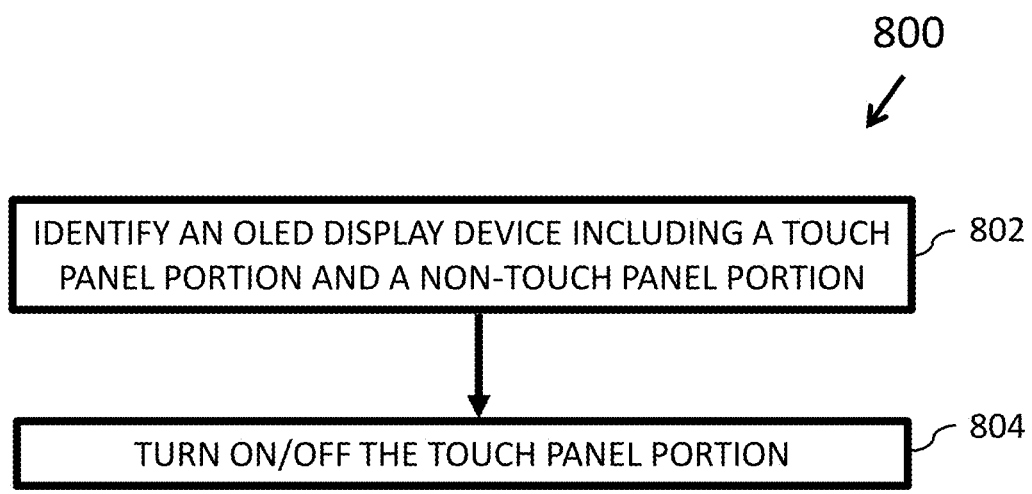

FIG. 8 is a schematic flow chart diagram illustrating one embodiment of a method 800 for managing touch capabilities of an expandable display device. At least in the illustrated embodiment, the method 800 begins by identifying, by a processor (e.g., processor 204), an OLED display device 100 including a touch panel portion (e.g., display panel portion 104) and at least one non-touch panel portion (e.g., display panel portion 106 and/or display panel portion 108) (block 802).

The method 800 further includes the processor 204 turning ON/OFF, by a processor (e.g., processor 204), the touch panel portion (block 804). In some embodiments, the touch panel portion is turned OFF in response to a display panel (e.g., display panel 102) being expanded and turned ON in response to the display panel 102 being contracted, as discussed elsewhere herein. In further embodiments, the touch panel portion is automatically turned OFF and ON in response to the display panel (e.g., display panel 102) being expanded and contracted, respectively.

Figure 9:
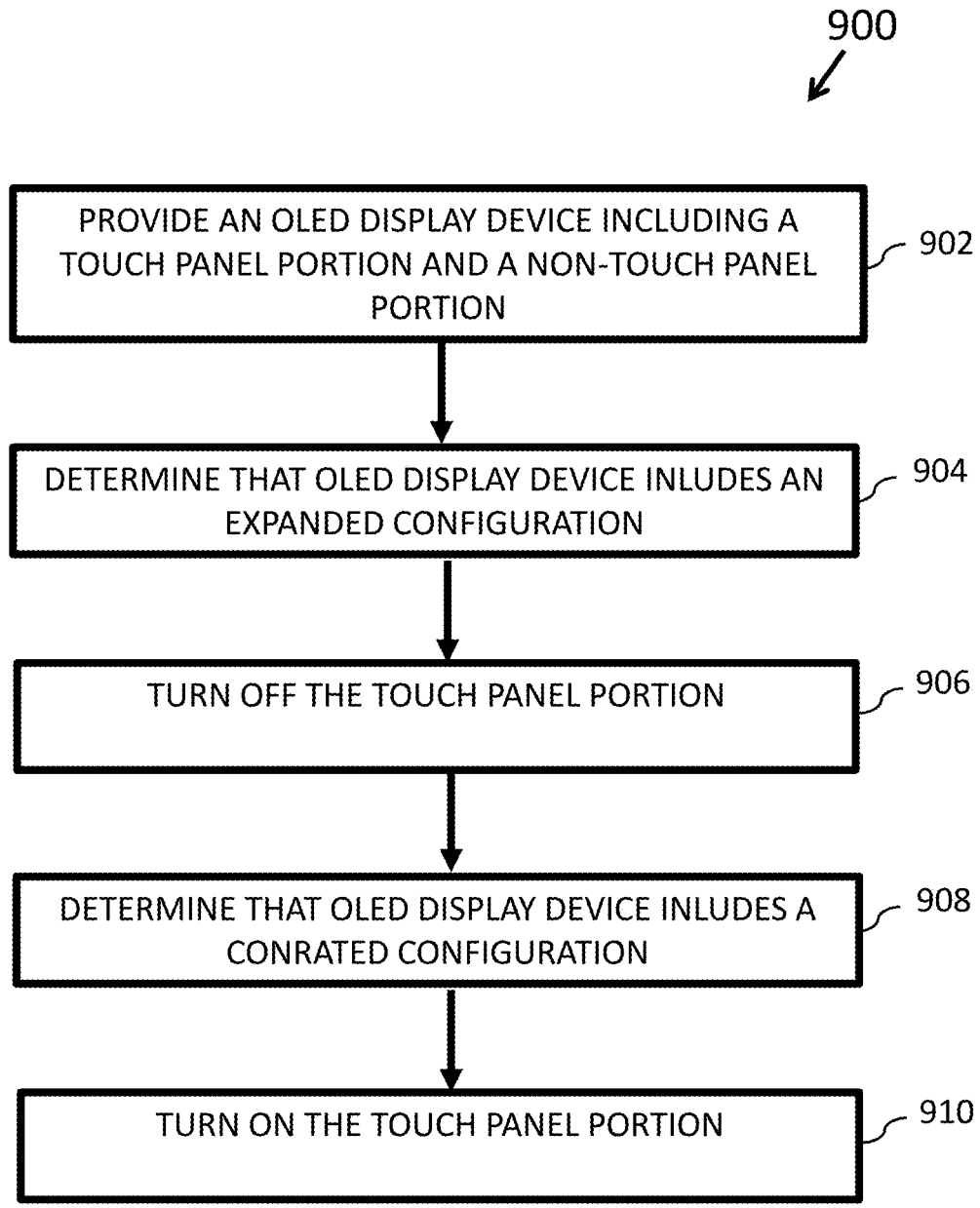

FIG. 9 is a schematic flow chart diagram illustrating another embodiment of a method 900 for managing touch capabilities of an expandable display device. At least in the illustrated embodiment, the method 900 begins by providing an OLED display device 100 including a touch panel portion (e.g., display panel portion 104) and at least one non-touch panel portion (e.g., display panel portion 106 and/or display panel portion 108) (block 902).

The method 900 further includes determining, by a processor (e.g., processor 204), that a display panel (e.g., display panel 102) of the OLED display device 100 includes an expanded configuration (block 904). The processor 204 turns OFF a touch panel portion 104 of the display panel 102 in response to the display panel 102 being expanded (block 906).

The processor 204 further determines that the display panel 102 includes a contracted configuration (block 908). The processor 204 turns ON the touch panel portion 104 in response to the display panel 102 being fully contracted (block 910).

Figure 10:
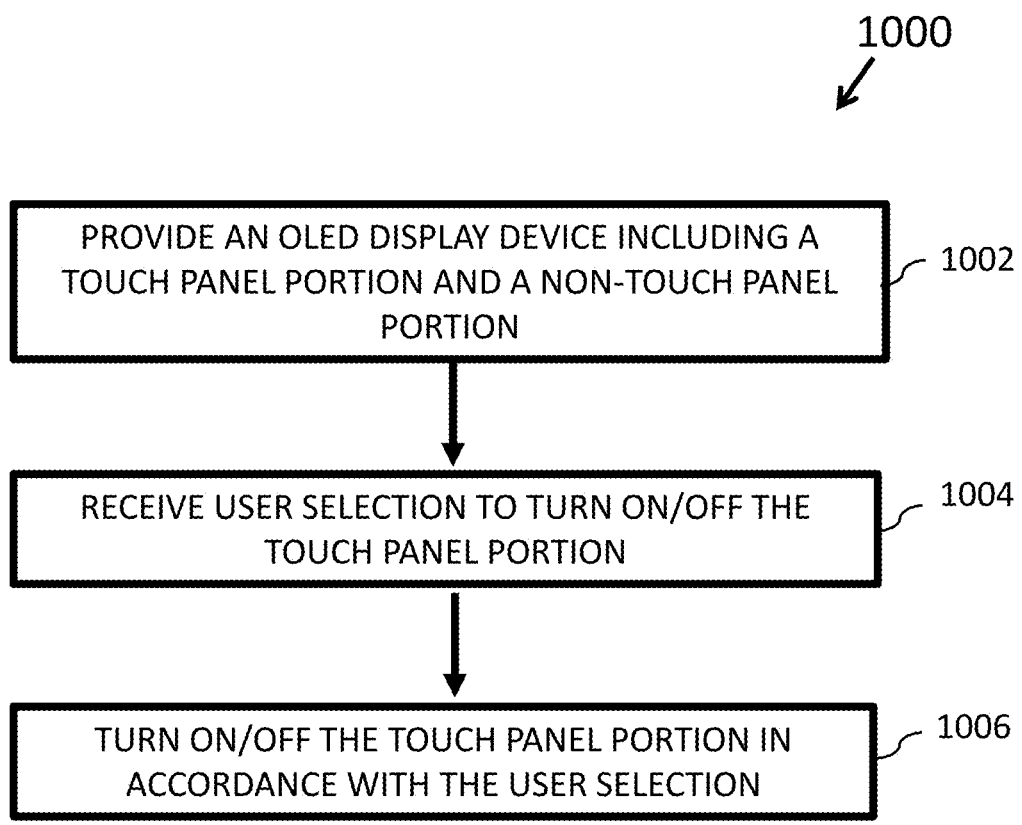

FIG. 10 is a schematic flow chart diagram illustrating another embodiment of a method 1000 for managing touch capabilities of an expandable display device. At least in the illustrated embodiment, the method 1000 begins by providing an OLED display device 100 including a touch panel portion (e.g., display panel portion 104) and at least one non-touch panel portion (e.g., display panel portion 106 and/or display panel portion 108) (block 1002).

The method 1000 further include receiving, by a processor (e.g., processor 204), a user selection to turn ON/OFF a touch panel portion (e.g., display panel portion 104) of a display panel 102 (block 1004). In some embodiment, the user selection is received in response to the processor transmitting a query to the user, as discussed elsewhere herein. In other embodiments, the user selection is a user input, as discussed elsewhere herein.

The processor 204 turns ON/OFF the touch panel portion in accordance with the user selection (block 1006). That is, the processor 204 turns ON the touch panel portion in in response to the user selection indicating that the user desires to turn ON the touch panel portion and turns OFF the touch panel portion in in response to the user selection indicating that the user desires to turn OFF the touch panel portion, as discussed elsewhere herein.

Figure 11:
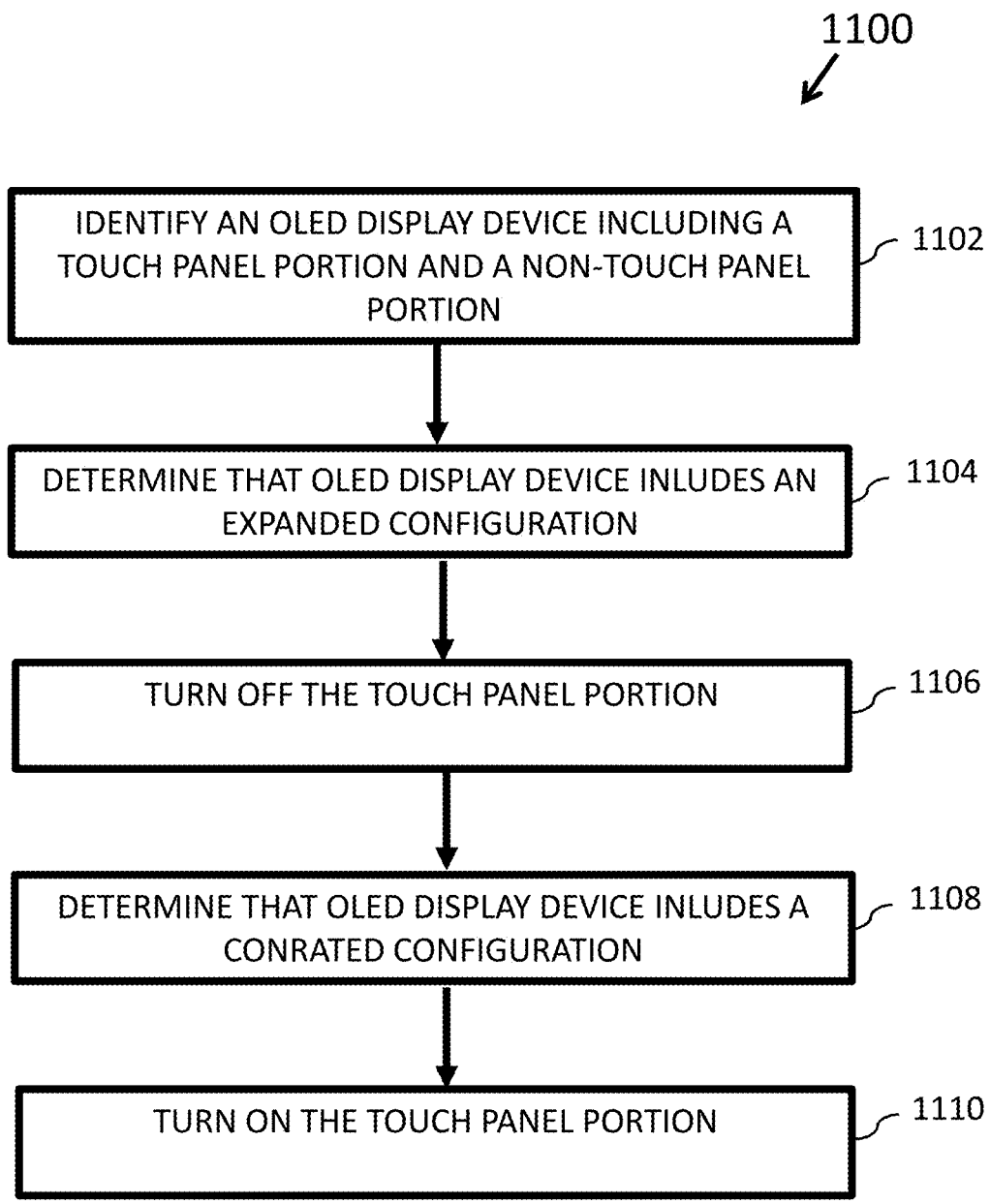

FIG. 11 is a schematic flow chart diagram illustrating another embodiment of a method 1100 for managing touch capabilities of an expandable display device. At least in the illustrated embodiment, the method 1100 begins by a processor (e.g., processor 204) identifying an OLED display device 100 including a touch panel portion (e.g., display panel portion 104) and at least one non-touch panel portion (e.g., display panel portion 106 and/or display panel portion 108) (block 1102).

The processor 204 determines that a display panel (e.g., display panel 102) of the OLED display device 100 includes an expanded configuration (block 1104). The processor 204 turns OFF a touch panel portion 104 of the display panel 102 in response to the display panel 102 being expanded (block 1106).

The processor 204 further determines that the display panel 102 includes a contracted configuration (block 1108). The processor 204 turns ON the touch panel portion 104 in response to the display panel 102 being fully contracted (block 1110).

Figure 12:
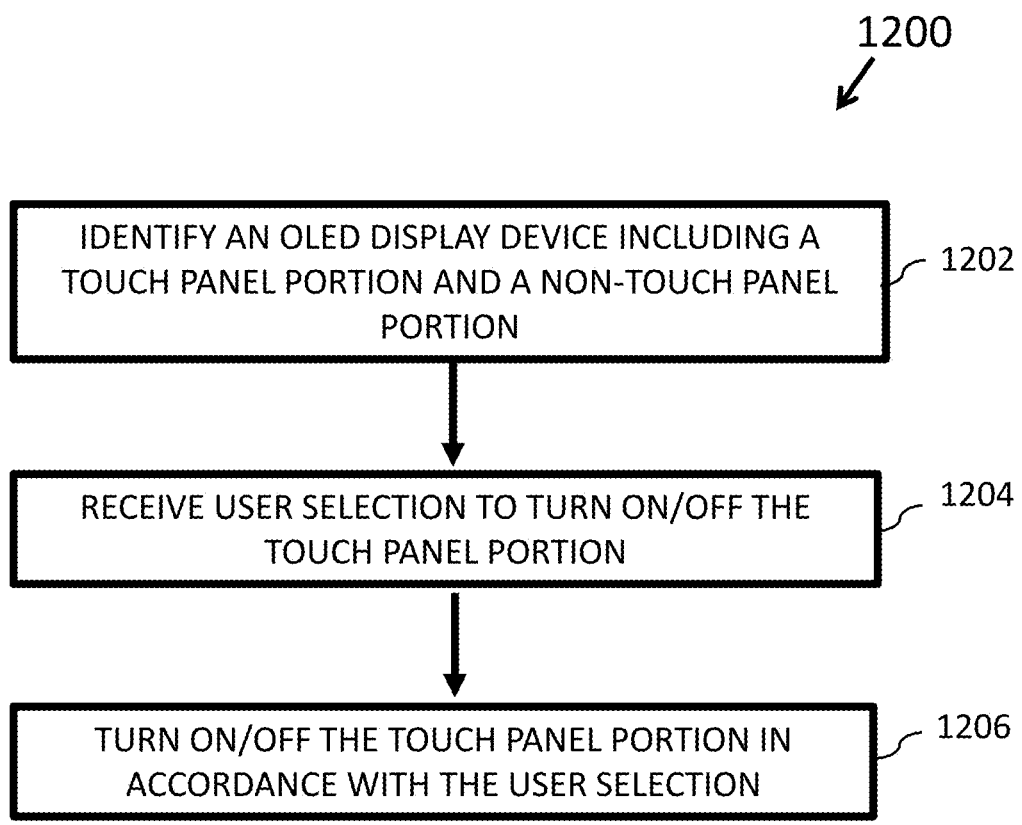

FIG. 12 is a schematic flow chart diagram illustrating another embodiment of a method 1200 for managing touch capabilities of an expandable display device. At least in the illustrated embodiment, the method 1200 begins by a processor (e.g., processor 204) identifying an OLED display device 100 including a touch panel portion (e.g., display panel portion 104) and at least one non-touch panel portion (e.g., display panel portion 106 and/or display panel portion 108) (block 1202).

The processor 204 receives a user selection to turn ON/OFF a touch panel portion (e.g., display panel portion 104) of a display panel 102 (block 1204). In some embodiment, the user selection is received in response to the processor 204 transmitting a query to the user, as discussed elsewhere herein. In other embodiments, the user selection is a user input, as discussed elsewhere herein.

The processor 204 turns ON/OFF the touch panel portion in accordance with the user selection (block 1206). That is, the processor 204 turns ON the touch panel portion in in response to the user selection indicating that the user desires to turn ON the touch panel portion and turns OFF the touch panel portion in in response to the user selection indicating that the user desires to turn OFF the touch panel portion, as discussed elsewhere herein.

While the various embodiments discussed herein are referenced as and/or related to a, digital learning environment, the various embodiments are not limited to a digital learning environment. That is, the various embodiments contemplate and include any suitable digital environment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a display device comprising a display panel including a first panel portion including touch capabilities and at least one second panel portion excluding touch capabilities, wherein each second panel portion is configured to expand in relation to the first panel portion to create an expanded configuration including an increase in a size for the display panel and to contract in relation to the first panel portion to create a contracted configuration including a decrease in the size for the display panel compared to the expanded configuration;
   a processor; and
   a memory configured to store code executable by the processor to manage the touch capabilities of the first panel portion.

2. The apparatus of claim 1, wherein the code executable by the processor to manage the touch capabilities of the first panel portion comprises code executable by the processor to turn ON/OFF the touch capabilities of the first panel portion.

3. The apparatus of claim 2, wherein the code executable by the processor further comprises code executable by the processor to automatically turn OFF the touch capabilities of the first panel portion responsive to the display panel including the expanded configuration.

4. The apparatus of claim 3, wherein:
   the code executable by the processor further comprises code executable by the processor to automatically turn ON the touch capabilities of the first panel portion responsive to the display panel including the contracted configuration.

5. The apparatus of claim 2, wherein the code executable by the processor further comprises code executable by the processor to transmit a query to a user whether to turn OFF the touch capabilities of the first panel portion responsive to the display panel including the expanded configuration.

6. The apparatus of claim 5, wherein the code executable by the processor further comprises code executable by the processor to:
receive a user response to the query;
turn OFF the touch capabilities of the first panel portion in response to the user response selecting that the touch capabilities of the first panel portion be turned OFF in the expanded configuration; and
maintain the touch capabilities of the first panel portion in response to the user response selecting that the touch capabilities of the first panel remain ON in the expanded configuration.

7. The apparatus of claim 6, wherein the code executable by the processor further comprises code executable by the processor to:
receive a user input subsequent to receiving the user response to the query;
turn OFF the touch capabilities of the first panel portion in response to the user input selecting that the touch capabilities of the first panel portion be currently turned OFF; and
turn ON the touch capabilities of the first panel portion in response to the user input selecting that the touch capabilities of the first panel portion be currently turned ON.

8. The apparatus of claim 1, wherein:
the code executable by the processor further comprises code executable by the processor to:
turn ON the touch capabilities of the first panel portion in response to the touch capabilities of the first panel portion being currently turned OFF and the display panel including the contracted configuration, and
maintain the touch capabilities of the first panel portion in response to the touch capabilities of the first panel portion being currently turned ON and the display panel including the contracted configuration.

9. A method, comprising:
providing a display device comprising a display panel including a first panel portion including touch capabilities and at least one second panel portion excluding touch capabilities, wherein each second panel portion is configured to expand in relation to the first panel portion to create an expanded configuration including an increase in a size for the display panel and to contract in relation to the first panel portion to create a contracted configuration including a decrease in the size for the display panel compared to the expanded configuration; and
turning ON/OFF, by a processor, the touch capabilities of the first panel portion.

10. The method of claim 9, wherein turning ON/OFF the touch capabilities of the first panel portion comprises automatically turning OFF the touch capabilities of the first panel portion responsive to the display panel including the expanded configuration.

11. The method of claim 10, wherein:
turning ON/OFF the touch capabilities of the first panel portion comprises automatically turning ON the touch capabilities of the first panel portion responsive to the display panel including the contracted configuration.

12. The method of claim 9, further comprising:
determining that the display panel includes the expanded configuration; and
transmitting a query to a user whether to turn OFF the touch capabilities of the first panel portion responsive to determining that the display panel includes the expanded configuration.

13. The method of claim 12, further comprising:
receiving a user response to the query;
turning OFF the touch capabilities of the first panel portion in response to the user response selecting that the touch capabilities of the first panel portion be turned OFF in the expanded configuration; and
maintaining the touch capabilities of the first panel portion in response to the user response selecting that the touch capabilities of the first panel remain ON in the expanded configuration.

14. The method of claim 13, further comprising:
receiving a user input subsequent to receiving the user response to the query;
turning OFF the touch capabilities of the first panel portion in response to the user input selecting that the touch capabilities of the first panel portion be currently turned OFF; and
turning ON the touch capabilities of the first panel portion in response to the user input selecting that the touch capabilities of the first panel portion be currently turned ON.

15. A computer program product comprising a computer-readable storage device including code embodied therewith, the code executable by a processor to cause the processor to:
identify a display device comprising a display panel including a first panel portion including touch capabilities and at least one second panel portion excluding touch capabilities, wherein each second panel portion is configured to expand in relation to the first panel portion to create an expanded configuration including an increase in a size for the display panel and to contract in relation to the first panel portion to create a contracted configuration including a decrease in the size for the display panel compared to the expanded configuration; and
turn ON/OFF the touch capabilities of the first panel portion.

16. The computer program product of claim 15, wherein the code for turning ON/OFF the touch capabilities of the first panel portion comprises code for automatically turning OFF the touch capabilities of the first panel portion responsive to the display panel including the expanded configuration.

17. The computer program product of claim 16, wherein:
the code for turning ON/OFF the touch capabilities of the first panel portion comprises code for automatically turning ON the touch capabilities of the first panel portion responsive to the display panel including the contracted configuration.

18. The computer program product of claim 15, further comprising code that causes the processor to:
determine that the display panel includes the expanded configuration; and
transmit a query to a user whether to turn OFF the touch capabilities of the first panel portion responsive to determining that the display panel includes the expanded configuration.

19. The computer program product of claim 18, further comprising code that causes the processor to:
receive a user response to the query;
turn OFF the touch capabilities of the first panel portion in response to the user response selecting that the touch capabilities of the first panel portion be turned OFF in the expanded configuration; and maintain the touch capabilities of the first panel portion in response to the user response selecting that the touch capabilities of the first panel remain ON in the expanded configuration.

20. The computer program product of claim 19, further comprising code that causes the processor to:

receive a user input subsequent to receiving the user response to the query;

turn OFF the touch capabilities of the first panel portion in response to the user input selecting that the touch capabilities of the first panel portion be currently turned OFF; and turn ON the touch capabilities of the first panel portion in response to the user input selecting that the touch capabilities of the first panel portion be currently turned ON.

\* \* \* \* \*